(12) United States Patent
Garza et al.

(10) Patent No.: US 6,768,078 B1
(45) Date of Patent: Jul. 27, 2004

(54) SERVO SPOT WELDING CONTROL SYSTEM AND METHOD OF WELDING WORKPIECES

(75) Inventors: Frank Garza, Rochester Hills, MI (US); Jason Tsai, Bloomfield Hills, MI (US); Hadi Akeel, Vienna, VA (US); Brad Niederquell, Troy, MI (US)

(73) Assignee: FANUC Robotics North America, Inc., Rochester Hills, MI (US)

( * ) Notice: Subject to any disclaimer, the term of this patent is extended or adjusted under 35 U.S.C. 154(b) by 28 days.

(21) Appl. No.: 10/339,047

(22) Filed: Jan. 9, 2003

(51) Int. Cl.$^7$ .............................................. B23K 11/11
(52) U.S. Cl. ........................................ 219/87; 901/42
(58) Field of Search ............................. 219/87, 86.25, 219/88, 91.2; 901/42

(56) References Cited

U.S. PATENT DOCUMENTS

| | | | | |
|---|---|---|---|---|
| 2,286,980 A | * | 6/1942 | Schanz ........................ | 219/87 |
| 3,205,337 A | * | 9/1965 | Hiemenz et al. .............. | 219/87 |
| 4,160,147 A | * | 7/1979 | Matsubara et al. ........... | 219/87 |
| 4,343,981 A | | 8/1982 | Connolly ..................... | 219/56 |
| 4,703,158 A | | 10/1987 | Burgher et al. ............... | 219/90 |
| 4,724,294 A | | 2/1988 | Klein .......................... | 219/86.7 |
| 4,761,533 A | | 8/1988 | Naruse et al. ............... | 219/86.7 |
| 5,111,019 A | | 5/1992 | Torli et al. ................... | 219/87 |
| 5,285,043 A | | 2/1994 | Smith ........................ | 219/86.9 |
| 5,313,040 A | | 5/1994 | Hayashi ........................ | 219/87 |
| 5,340,960 A | | 8/1994 | Takasaki et al. ........... | 219/86.7 |
| 5,528,011 A | | 6/1996 | Kuno et al. ............... | 219/86.41 |
| 5,548,096 A | | 8/1996 | Akasaka et al. ......... | 219/117.1 |
| 5,641,415 A | | 6/1997 | Kosaka et al. ........... | 219/86.25 |
| 5,990,442 A | | 11/1999 | Suita et al. ............... | 219/86.25 |
| 6,059,169 A | | 5/2000 | Nihei et al. .................... | 228/45 |
| 6,124,693 A | | 9/2000 | Okanda et al. ......... | 318/568.11 |
| 6,429,397 B1 | | 8/2002 | Sun et al. ................. | 219/86.25 |
| 6,512,194 B1 | * | 1/2003 | Koshurba et al. ......... | 219/86.25 |

OTHER PUBLICATIONS

Patent Publication US2002/0104829 A1, dated Aug. 8, 2002 Applicant: Sun et al. Entitled: "Programmable Pogo Welding Apparatus and Method".

* cited by examiner

*Primary Examiner*—Clifford C. Shaw
(74) *Attorney, Agent, or Firm*—Howard & Howard (57) ABSTRACT

A servo spot welding control system and method to efficiently weld a pair of workpieces together. The system includes a robot movable about the workpieces, a weld gun, servomotors, a transformer, and a controller. The weld gun is mounted on the robot and includes at least two pairs of electrodes. Each pair of electrodes includes a stationary electrode and a moveable electrode. The servomotors are operatively connected to the movable electrodes. The controller actuates the robot to move the robot into position. The controller also actuates the servomotors to clamp the workpieces and to selectively sequence electric current from the transformer to form multiple spot welds on the workpieces.

32 Claims, 9 Drawing Sheets

SERVO SPOT WELDING CONTROL SYSTEM AND METHOD OF WELDING WORKPIECES

BACKGROUND OF THE INVENTION

1. Field of the Invention

The subject invention relates to a servo spot welding control system including a robot and multiple electrodes for efficiently welding a pair of workpieces together. The subject invention also relates to a method for welding the pair of workpieces together.

2. Description of Related Art

Various welding control systems are known in the art. One example of a welding control system is disclosed in U.S. Pat. No. 5,111,019. More specifically, the '019 patent discloses a welding control system for resistance spot welding. A pair of transformers and a pair of spot welding guns are attached to a wrist of a robot. Each welding gun has a pair of electrodes, a fixed electrode and a movable electrode. A fluid-activated cylinder, such as an air cylinder, is used to actuate movement of the movable electrode during welding.

The '019 patent does not disclose the use of servomotors to actuate the movable electrodes. Servomotors are more desirable than cylinders for several reasons. First, the pressure on the workpieces can be controlled more accurately, allowing higher quality welds and less damage to the workpieces. Furthermore, servomotors typically operate more quickly than cylinders, which reduces overall cycle time. Yet another reason is that servomotors are quieter than air cylinders since there is no pneumatic exhaust associated with the servomotors. The '019 patent also does not disclose the use of a single transformer and a controller to sequence electric current between the electrodes. A single transformer reduces weight on the robot arm and cost of the overall system.

Another example of a welding control system is disclosed in U.S. Pat. No. 5,313,040. The '040 patent also discloses a welding control system for resistance spot welding. Multiple weld guns are mounted in fixed locations. Only one weld is created at one time. The '040 patent does not disclose a weld gun with multiple welding electrodes that is mounted on a robot that can be controlled and manipulated in many different positions and orientations. Mounting the weld gun on the robot provides greater flexibility than multiple weld guns that are mounted in fixed locations.

A final example of a welding control system is disclosed in U.S. Pat. No. 5,340,960. The '960 patent also discloses a servo weld control system for resistance spot welding. The system includes a robot, a welding gun, a robot controller, and a servomotor. The welding gun has a single pair of electrodes, a fixed electrode and a movable electrode. The servomotor actuates the single movable electrode. The '960 patent does not disclose multiple pairs of electrodes on one weld gun or a controller and method to sequence electric current to the multiple pairs of electrodes. Having multiple pairs of electrodes can improve cycle time since the robot need not always move to accomplish multiple spot welds. In addition, having multiple pairs of electrodes on one weld gun can reduce the dependence on multiple weld control systems at a single location.

Due to the deficiencies in the welding control systems identified above, there remains an opportunity to introduce a welding control system with faster cycle times, less equipment costs, greater flexibility, improved weld quality, and reduced damage to workpieces.

SUMMARY OF THE INVENTION AND ADVANTAGES

The invention provides a servo spot welding control system and method for efficiently welding a pair of workpieces together. The system includes a robot and a weld gun. The weld gun is movable about the workpieces, and the weld gun is mounted to the robot. The weld gun includes at least two pairs of electrodes, each pair including a stationary electrode and a movable electrode. A first servomotor is operatively connected to one of the movable electrodes and a second servomotor is operatively connected to the other of the movable electrodes. This arrangement allows for independent control of each movable electrode. The first servomotor clamps the workpieces between one of the pairs of electrodes and the second servomotor clamps the workpieces between the other of the pairs of electrodes. The system also includes a transformer. The transformer supplies electric current that flows through the pairs of electrodes for welding the workpieces together. The system further includes a controller to sequence the electric current between the pairs of electrodes.

The method of the subject invention utilizes the servo spot welding control system to weld the workpieces together. The method includes the step of moving the robot to dispose the weld gun about the workpieces. Electrical current is supplied to the first and second movable electrodes from the transformer. The workpieces are clamped between the first pair of electrodes on the weld gun. This allows the electric current to flow through the first movable electrode, the workpiece, and the first stationary electrode to create a first spot weld. The workpieces are released from the clamp of the first pair of electrodes. Upon release, the electric current is prevented from flowing. The workpieces are clamped between the second pair of electrodes on the weld gun. The clamping of the workpieces between the second pair of electrodes is done without additional movement of the robot. The clamping then allows the electric current to flow through the second movable electrode, the workpiece, and the second stationary electrode. As a result, a second spot weld is created, and the workpieces are then released from the clamp of the second pair of electrodes to prevent the electric current from flowing. It is to be appreciated that the robot could move the weld gun slightly between the first spot weld and the second spot weld. This may occur, for example, when a curved workpiece is to be welded.

The servo spot welding control system and method of the subject invention provide several advantages over the related art. This system and method provide faster cycle times than robot-mounted servo weld guns having only one pair of electrodes. Faster cycle times are accomplished because the robot does not have to reposition itself between each individual spot weld. The system and method also provide less equipment costs. Those skilled in the art will appreciate that it often takes two complete prior art spot welding systems, with two robots and one pair of electrodes per robot, to perform spot welds within an allotted cycle time. In the present invention, only one servo spot welding control system is necessary to accomplish the same number of spot welds as two systems of the prior art. The system and method also provide improved weld quality and less damage to the workpieces. The servomotor driven electrodes provide very accurate and controlled pressure to the workpieces. This results in better quality spot welds as compared to spot welds that are provided by electrodes that are driven by fluid-actuated cylinders. Also, servomotor driven electrodes can provide position and force feedback, synchronization with robot movement, and a complete range of electrode movement. Finally, having electric current supplied to multiple electrodes by a single transformer reduces the payload of the robot and allows the robot to move with faster accelerations between spot welds. These faster accelerations allow short cycle times for better productivity.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a servo spot welding control system is generally shown at 10. The welding control system 10 of the subject invention is used to efficiently weld a pair of workpieces 12 together.

Figure 1:
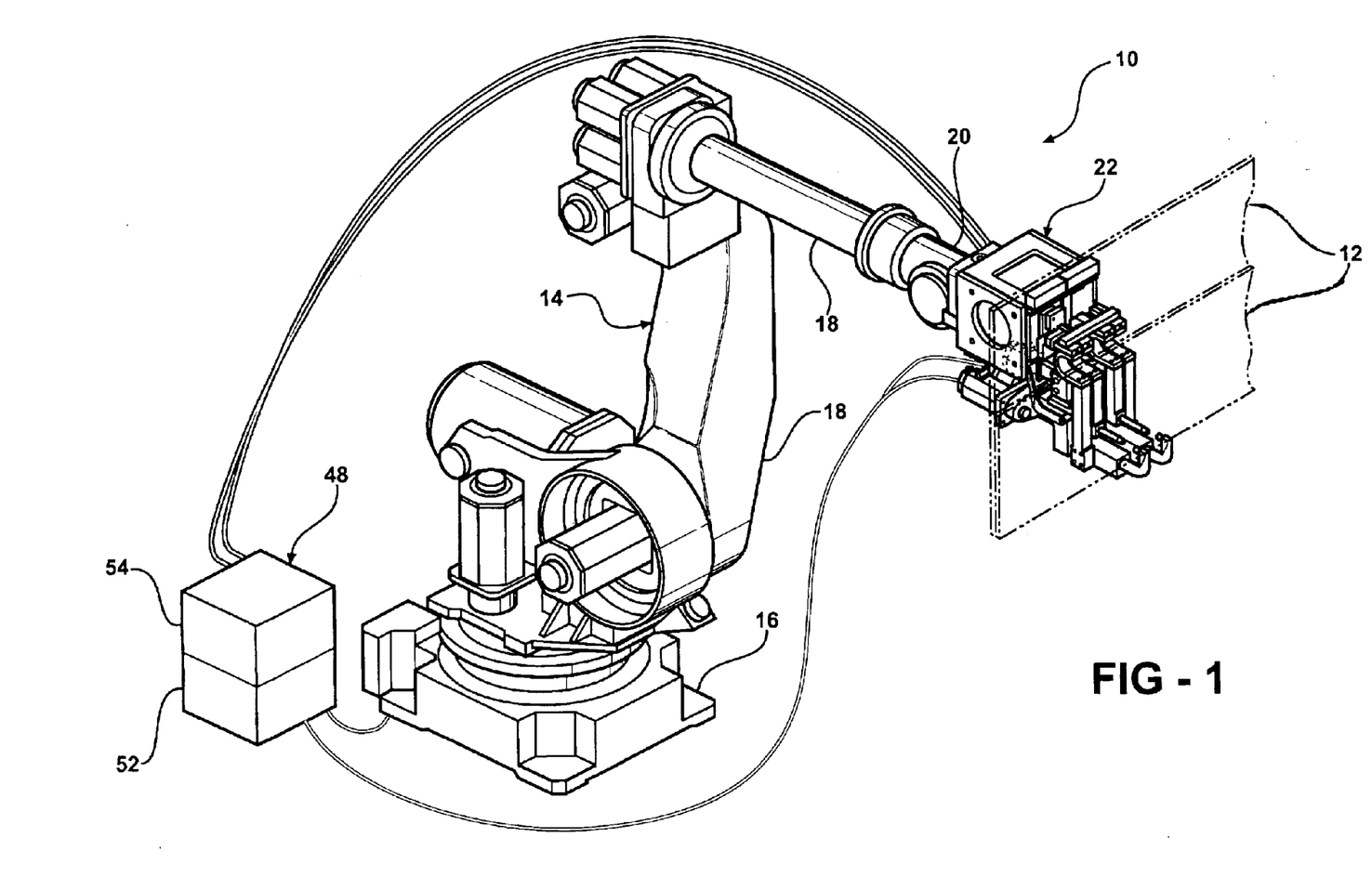
FIG. 1 is a perspective view of a servo spot welding control system of the subject invention.

Referring to FIG. 1, the welding control system 10 includes a robot 14. The robot 14 is movable about the workpieces 12. It is preferred that the robot 14 has a base 16, a plurality of arms 18 operatively connected to the base 16, and a wrist 20 operatively connected to the arms 18. However, it is to be understood that alternative robots, not including all of these components, may also be used in combination with the welding control system 10 of the subject invention.

The welding control system 10 also includes a weld gun 22. The weld gun 22 is mounted to the robot 14. Preferably, the weld gun 22 is mounted to the wrist 20 of the robot 14. However, it is to be understood that in other embodiments the weld gun 22 could be mounted to alternative components on the robot 14.

Figure 2A:
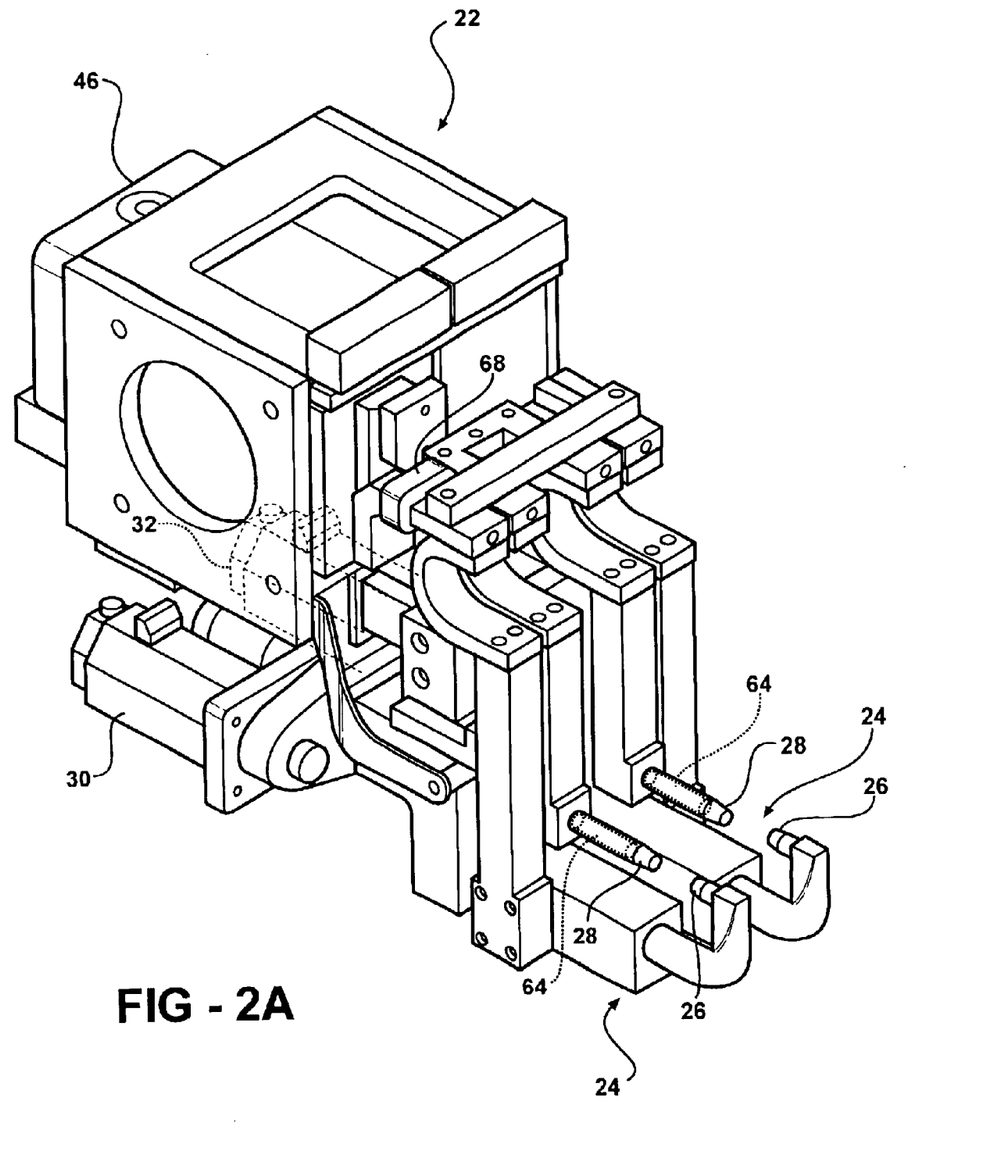
FIG. 2A is a perspective view of a weld gun with two pairs of electrodes and one transformer electrically connected to the electrodes.

Referring now to FIG. 2A, the weld gun 22 includes at least two pairs of electrodes 24. Each pair of electrodes 24 includes a stationary electrode 26 and a movable electrode 28. A first servomotor 30 is operatively connected to one of the movable electrodes 28 for clamping the workpieces 12 (not shown in FIG. 2A) between one of the pairs of electrodes 24. A second servomotor 32 is operatively connected to the other of the movable electrodes 28 for clamping the workpieces 12 between the other of the pairs of electrodes 24. It is preferred that the first servomotor 30 and the second servomotor 32 be mounted to the weld gun 22. However, it is to be understood that in other embodiments the first and second servomotors 30,32 could be mounted to alternative locations, including locations not on the robot 14.

Figure 2B:
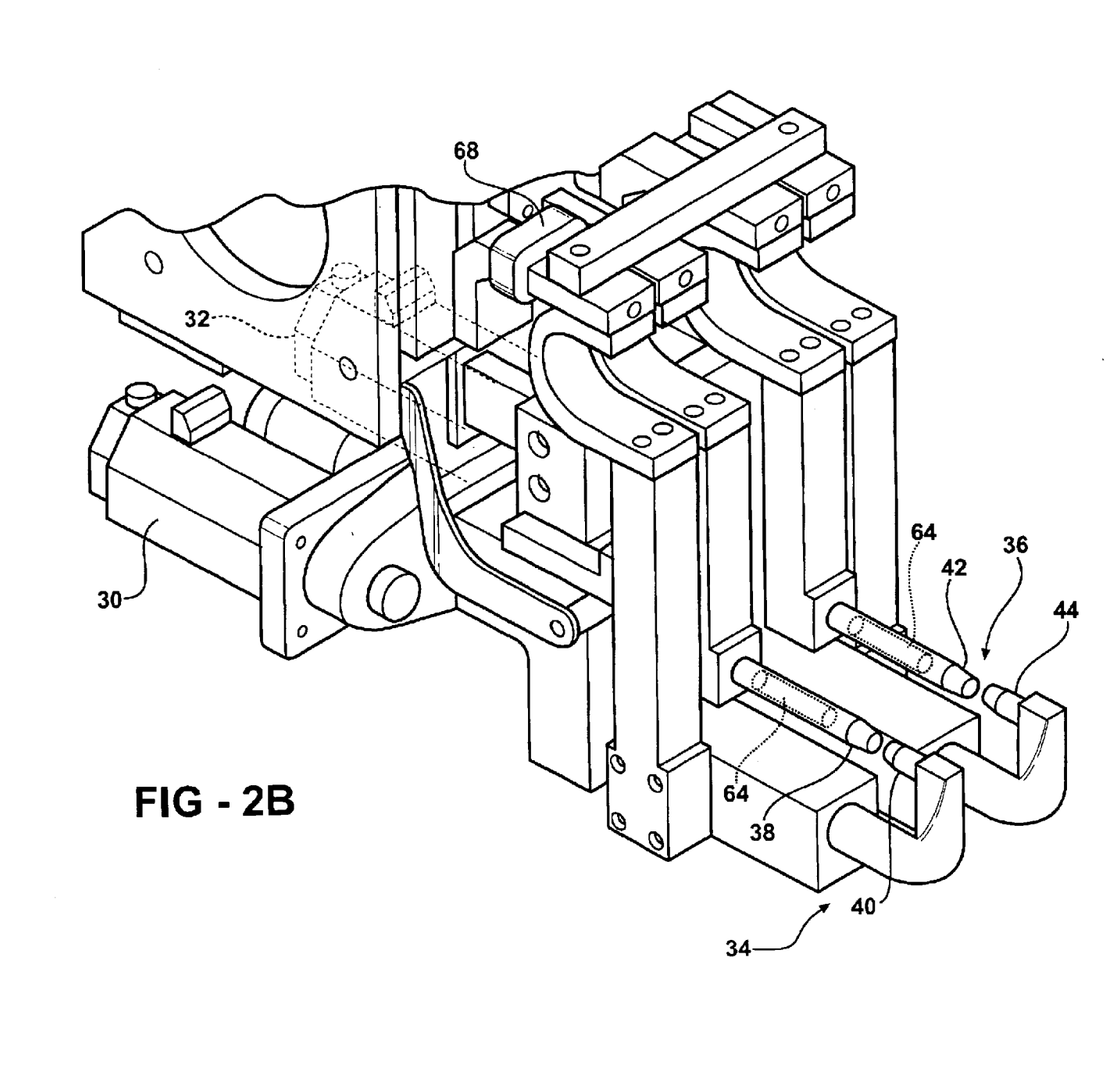
FIG. 2B is an enlarged perspective view of the two pairs of electrodes in FIG. 2A.
Figure 2C:
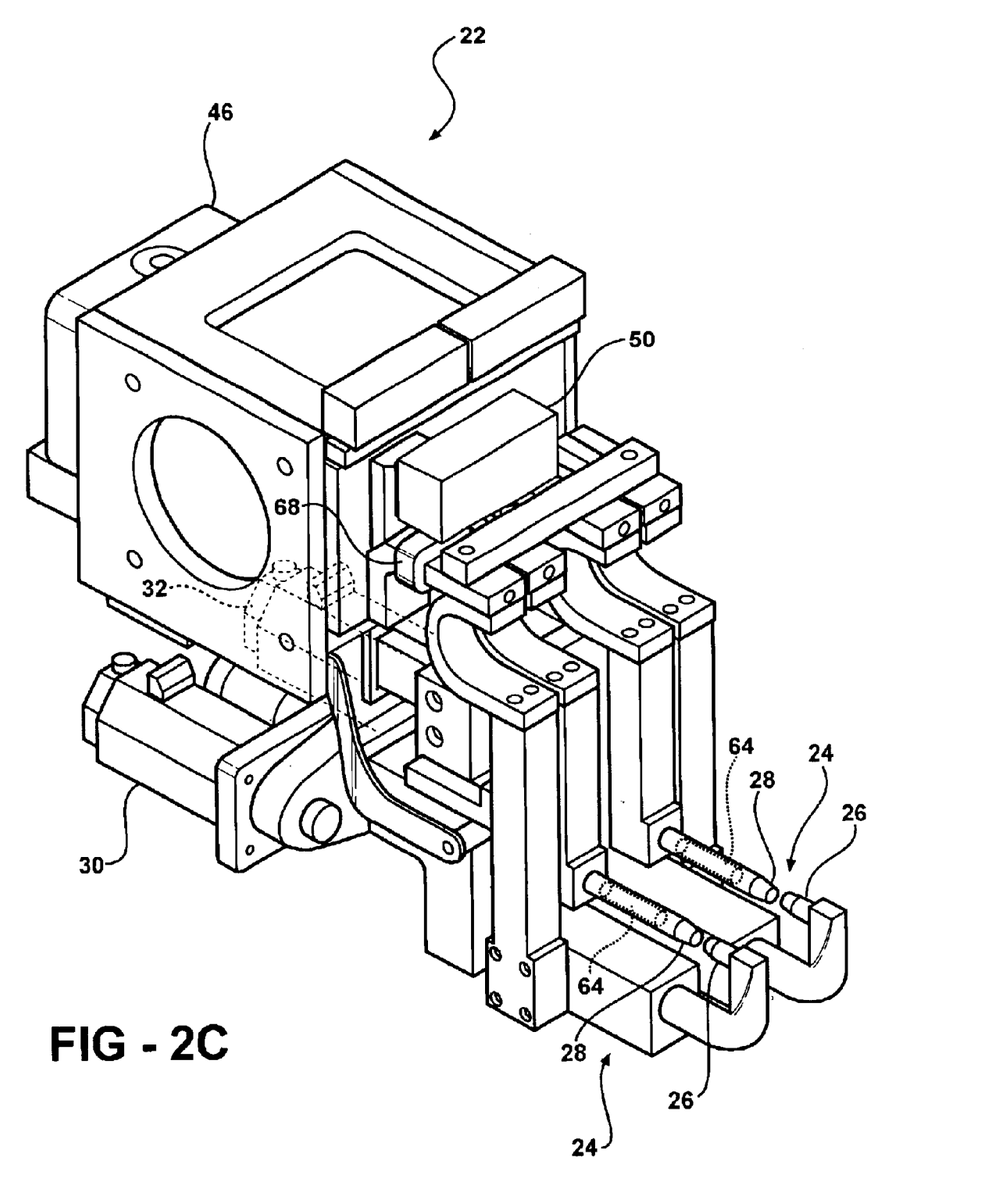
FIG. 2C is a perspective view of the weld gun with two pairs of electrodes and a switch for directing electrical current to one of the pairs of electrodes.

The weld gun 22 is more specifically disclosed in FIG. 2B. Referring now to FIG. 2B, the at least two pairs of electrodes 24 are further defined as a first pair of electrodes 34 and a second pair of electrodes 36. The first pair of electrodes 34 includes a first movable electrode 38 and a first stationary electrode 40. The second pair of electrodes 36 includes a second movable electrode 42 and a second stationary electrode 44. The first servomotor 30 is operatively connected to the first movable electrode 40 for clamping the workpieces 12 between the first pair of electrodes 34, and the second servomotor 32 is operatively connected to the second movable electrode 42 for clamping the workpieces 12 between the second pair of electrodes 36. The servomotors 30,32 can operate independent of one another.

Figure 2D:
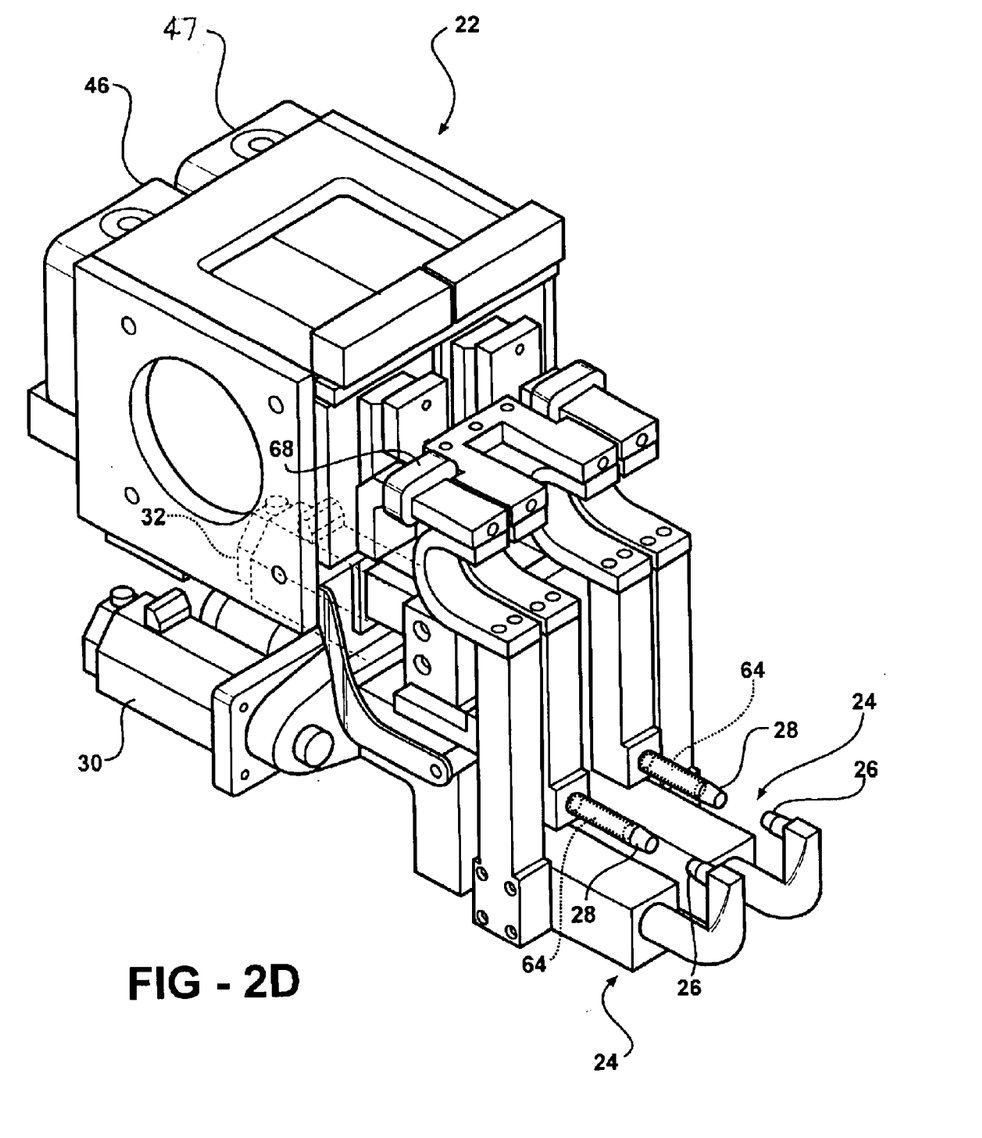
FIG. 2D is a perspective view of the weld gun with two pairs of electrodes and a transformer electrically connected to each pair of electrodes.

Referring again to FIG. 2A, a transformer 46 is used for supplying electric current to the pairs of electrodes 24. In the subject invention, the transformer 46 is electrically connected to both pairs of electrodes 24. Therefore, even though the weld gun 22 of the subject invention incorporates multiple pairs of electrodes 24, only one transformer 46 is required. Preferably, the transformer 46 is a step-down type transformer, meaning the transformer 46 lowers the voltage and raises the current of the electrical current that is supplied to it. This results in electrical current with high current. Such electrical current is appropriate for spot welding. The electrical current flows through the pairs of electrodes 24 for welding the workpieces 12 together. It is preferred that the transformer 46 be mounted to the weld gun 22. However, it is to be understood that the transformer 46 could be mounted in alternative locations remote from the weld gun 22. Referring to FIG. 2D, it should also be appreciated that at least one additional transformer 47 could be utilized to supply current to the pairs of electrodes 24. In such a case, each pair of electrodes 24 would be supplied current by its own transformer 46,47.

Referring again to FIG. 1, the system 10 further includes a controller 48. The controller 48 sequences the electric current between the pairs of electrodes 24. As a result, the electric current only flows through one pair of electrodes 24 at a time and may be controlled independently for each pair of electrodes 24.

Figure 3A:
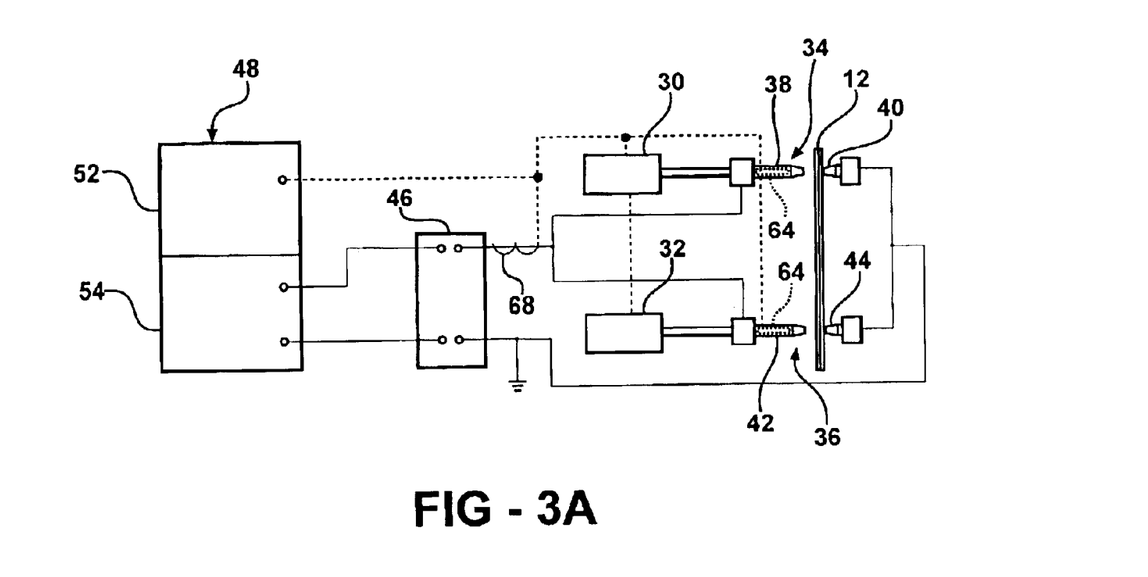
FIG. 3A is a schematic representation of the controller, two servomotors, two pairs of electrodes, and the pair of workpieces.

For descriptive purposes, the sequencing of the electric current is illustrated in two embodiments. Referring to FIG. 3A, electric current is present at all movable electrodes 38,42. However, the electric current cannot flow until a complete circuit is created by one of the movable electrodes 38,42 clamping against the workpieces 12. To accomplish this, the controller 48, which is operatively connected to the first and second servomotors 30,32, selectively actuates the first and second servomotors 30,32. This clamps either one of the movable electrodes 38,42 to selectively switch the electric current between each of the pairs of electrodes 24.

Figure 3B:
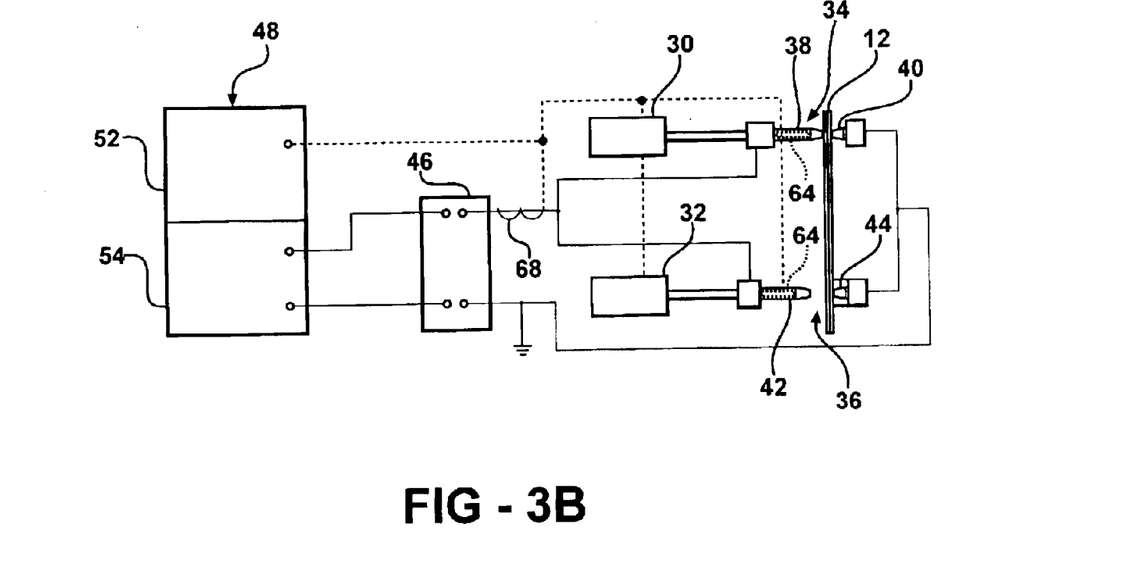
FIG. 3B is the schematic representation of FIG. 3A illustrating one pair of electrodes clamped about the workpieces.

Referring now to FIG. 3B, to illustrate this process, if two welds are needed at one position of the weld gun 22, the first servomotor 30 actuates the first movable electrode 38 to clamp the workpieces 12, thus allowing the electric current to flow and a weld to be formed. Next, the controller 48 actuates the first servomotor 30 to retract the first movable electrode 38. This cuts off the flow of electric current. Next, the second servomotor 32 actuates the second movable electrode 42 to clamp the workpieces 12, thus allowing the electric current to flow and another weld to be formed. Finally, the controller 48 actuates the second servomotor 32 to retract the second movable electrode 42.

Figure 4A:
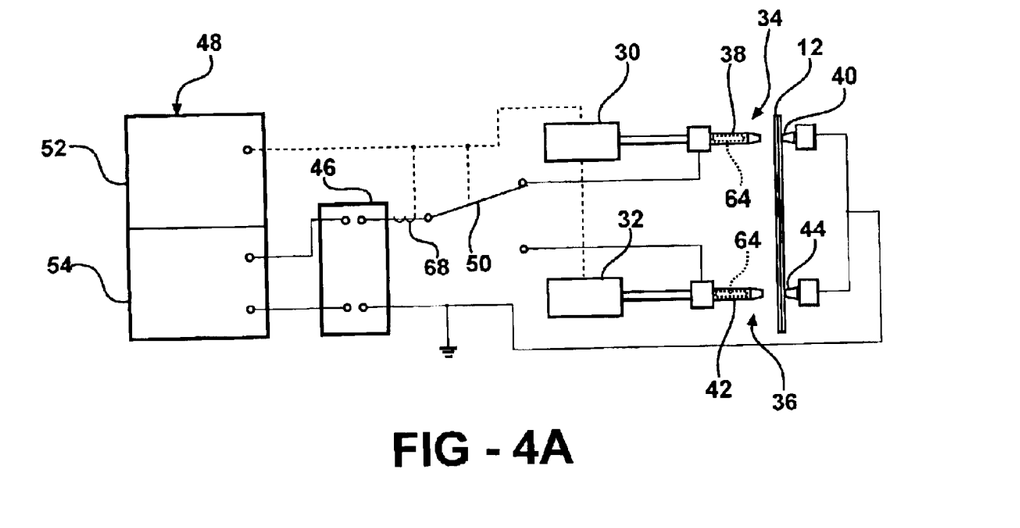
FIG. 4A is a schematic representation of the controller, two servomotors, two pairs of electrodes, the switch for directing electrical current, and the pair of workpieces.
Figure 4B:
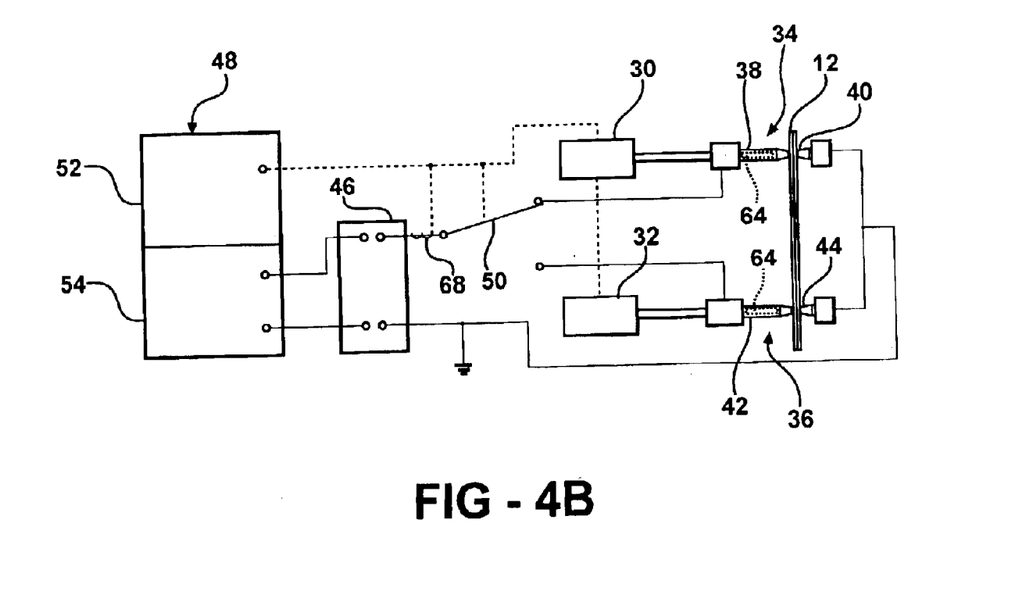
FIG. 4B is a schematic representation of FIG. 4A illustrating both pairs of electrodes clamped about the workpieces while electric current is routed to only one pair of electrodes.

Referring to FIG. 4A, in the second embodiment, a switch 50 is operatively connected to the controller 48. The switch 50 is disposed between the transformer 46 and the pairs of electrodes 34,36 for selectively switching the electric current between each of the pairs of electrodes 34,36. As shown in FIG. 4B, both pairs of electrodes 34,36 can now clamp simultaneously while the switch 50 directs the electric current to the first pair of electrodes 34 or the second pair of electrodes 36. Therefore, the second pair of electrodes 36 can hold the workpieces 12 while the first pair of electrodes 34 welds the workpieces 12, or vice-versa.

Referring back to FIG. 1, it is most preferred that the controller 48 is further defined as a robot controller 52 and a weld controller 54 that is independent from the robot controller 52. The robot controller 52 is operatively connected to the robot 14 and is dedicated for moving the robot 14 about the workpieces 12. The robot controller 52 is also operatively connected to the servomotors 30,32 for extending and retracting the movable weld tips 28. Referring to FIGS. 4A and 4B, the robot controller 52 may also be operatively connected to the at least two pressure sensors 64 to sense a clamping pressure between each pair of electrodes 24. It is preferred that the at least two pressure sensors 64 are located within the movable electrodes 28, however, it should be appreciated that the at least two pressure sensors 64 may be located at different locations. The robot controller 52 may also be operatively connected to at least one electric current sensor 68 to sense the electric current flowing through the pairs of electrodes 24. It is preferred that the at least one electric current sensor 68 be located at a high-potential secondary terminal of the transformer 46. However, those skilled in the art will appreciate that several other locations are acceptable for locating the at least one electric current sensor 68, including a primary side of the transformer 46. The robot controller 52 may also be operatively connected to at least one voltage sensor to sense the electric voltage across the pairs of electrodes 24. It is preferred that the at least one voltage sensor obtains readings from the movable electrodes 28 and the stationary electrodes 26. However, those skilled in the art will appreciate that other locations are acceptable for obtaining voltage readings. The robot controller 52 may also be operatively connected to at least one displacement sensor. The at least one displacement sensor is capable of measuring movement of the movable electrodes 28 relative to the workpieces 12 during the spot welds.

The weld controller 54 is electrically connected to the transformer 46 and is dedicated to supplying current to the transformer 46. Although it is most preferred that there are two controllers 48, the robot controller 52 and the weld controller 54 separate from the robot controller 52, it is to be understood that one controller 48 can be electrically connected to the robot 14, the servomotors 30,32, the at least two pressure sensors 64, the at least one electric current sensor 68, the at least one voltage sensors, the at least one displacement sensor, and the transformer 46 to accommodate all of the required functions.

Figure 5A:
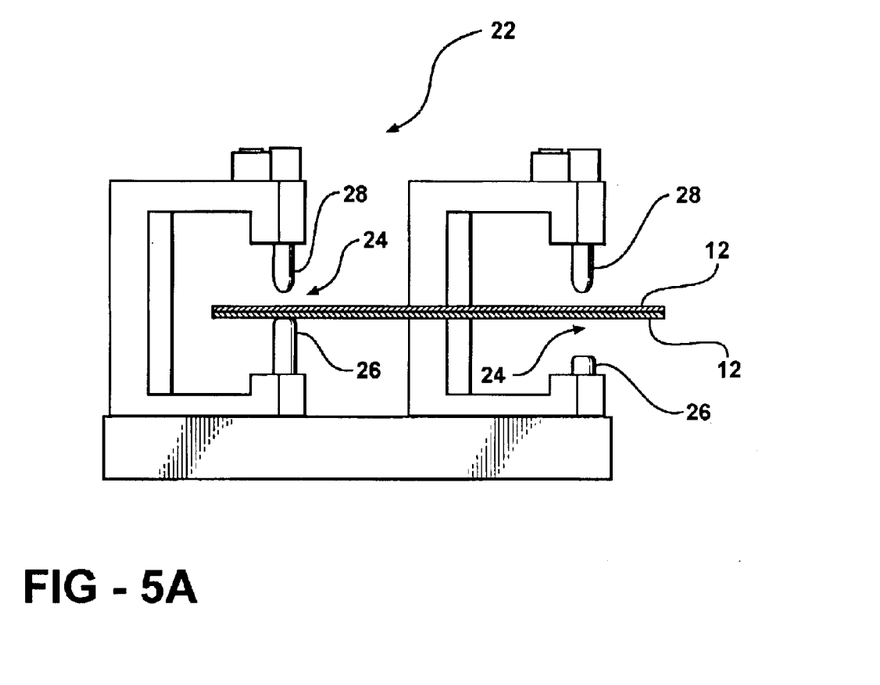
FIG. 5A is a schematic representation of the weld gun, with one fixed electrode having wear and not being in contact with the workpieces.
Figure 5B:
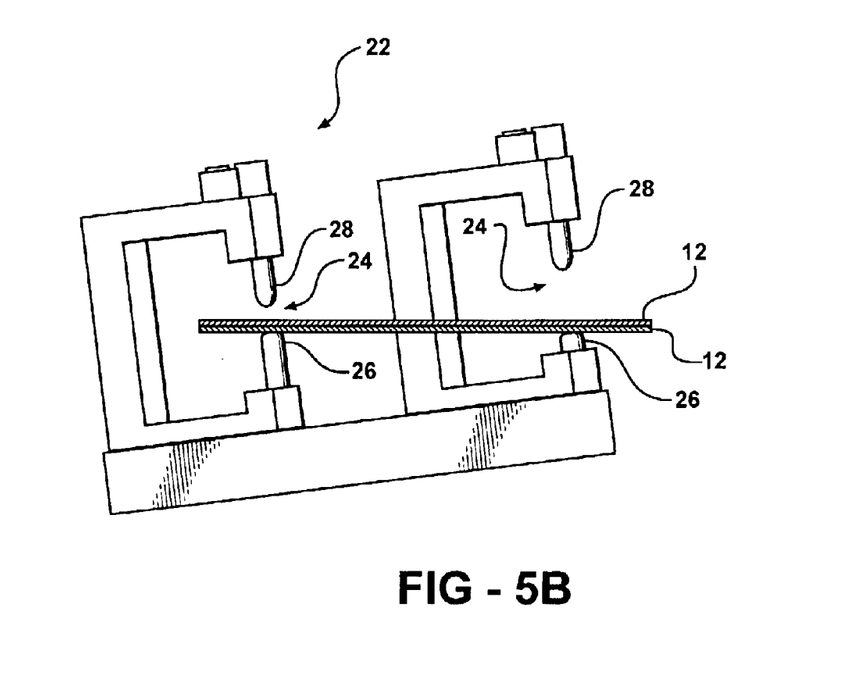
FIG. 5B is a schematic representation of the weld gun, with one fixed electrode showing wear and a position of the weld gun adjusted so that both fixed electrodes contact the workpieces.

The robot controller 52 includes programmable software for controlling the movement of the robot 14 and the first and second servomotors 30,32. The software makes automatic adjustments to the movement of the robot 14 and the first and second servomotors 30,32 based on wear of the pairs of electrodes 24. As the weld gun 22 is oriented in FIG. 5A, the left stationary electrode 26 is normal and the right stationary electrode 26 is worn. This results in an undesirable situation where one stationary electrode 26 is in contact with the workpieces 12 while the other stationary electrode 26 does not make contact with the workpieces 12. If the right movable electrode 28 were actuated in this orientation, the movable electrode 28 would bend and damage the workpieces 12. Referring now to FIG. 5B, the software has made automatic adjustments to the position and orientation of the weld gun 22. These adjustments allow both stationary electrodes 26 make contact with the workpieces 12. In addition, the software adjusts the movement of the movable electrodes 28 to maintain proper pressure on the workpieces 12.

An additional aspect of the software is known by those skilled in the art as "equalization". The process of equalization ensures that the pressure generated by the pair of weld tips 24 is equal on both sides of the workpieces 12. The software of the present invention provides methods for equalization, even when the weld gun has made automatic adjustments for uneven tip wear, as illustrated in FIG. 5B.

In addition, the software may use signals that represent clamping pressures from the at least two pressure sensors 64. The software automatically adjusts clamping pressure between each pair of electrodes 24 based on these signals.

The software may also use signals that represent electric current from the at least one electric current sensor 68. The electric current sensor 68 is also known to those skilled in the art, as a current transformer, "CT", toroid, or doughnut. The software automatically adjusts the amount of electric current that is provided to the pairs of electrodes 24 in order to provide improved spot welds. In addition, it is to be understood by those skilled in the art, that additional sensors, such as the voltage or the displacement sensors describe above, may need to be implemented for measuring other characteristics, including, but not limited to, voltage and displacement. Signals from these sensors are to be used in combination with the signals received from the electric current sensor such that the weld time can be automatically adjusted.

It is important to note the consequences of an improper clamping pressure and an improper amount of electric current when creating spot welds. If the clamping pressure is too low, the pair of electrodes 24 will not be able to contain the molten metal. As a result, an "expulsion" of the molten metal occurs, resulting in a poor spot weld. In severe cases, this expulsion can result in a hole being formed in the workpieces 12. Expulsion can also occur when excessive heat is generated at the spot weld. Excessive heat is often the result of too much electric current being supplied to the pair of electrodes 24. Not enough heat at the spot weld results when too much pressure is applied to the workpieces 12 or too little electric current is supplied. When not enough heat is applied, a weak bond is formed between the workpieces 12.

Figure 6:
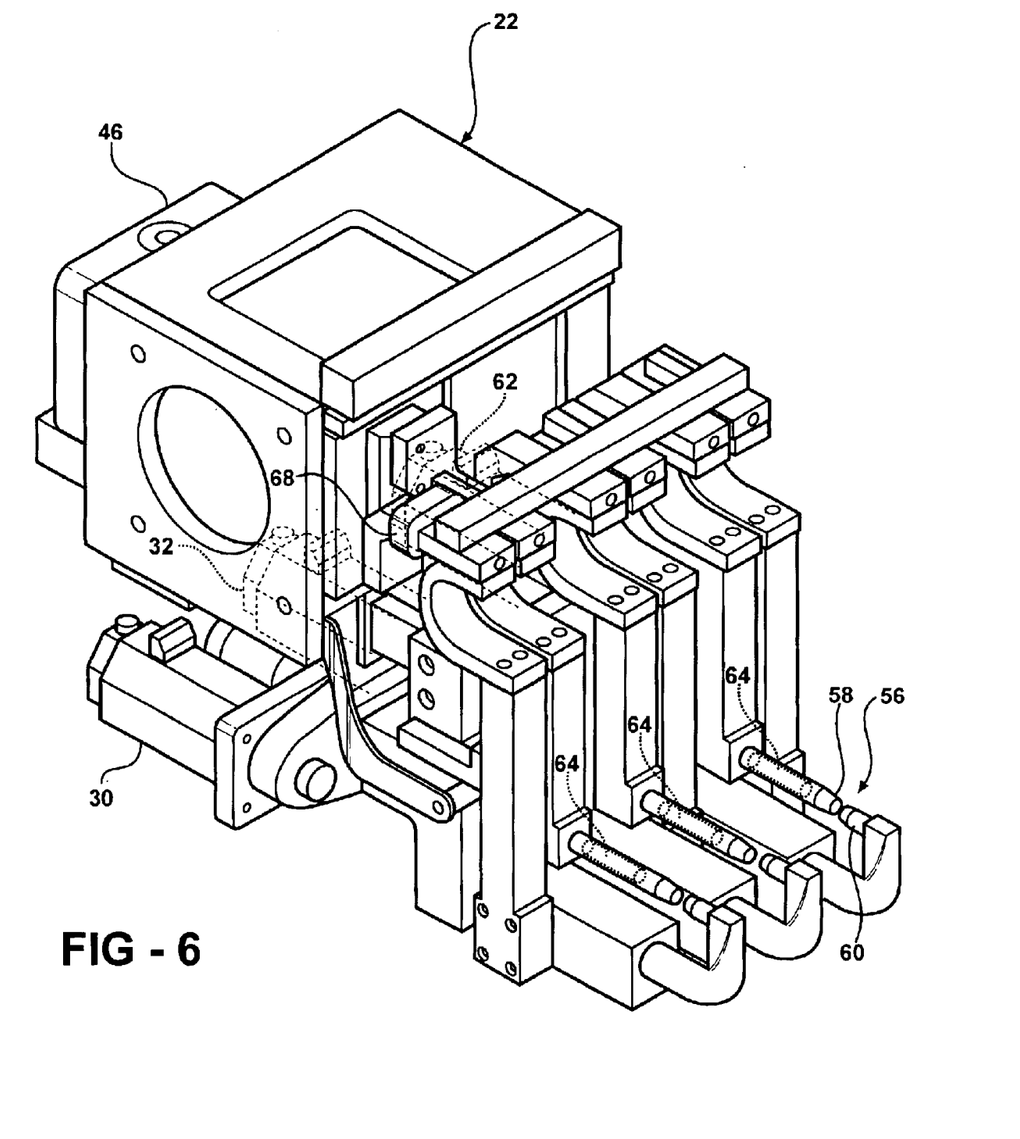
FIG. 6 is a perspective view of the weld gun with three pairs of electrodes.

It is to be appreciated that more than two pairs of electrodes 24 can be situated on the weld gun 22. Referring to FIG. 6, the at least two pairs of electrodes 24 is further defined to include a third pair of electrodes 56 including a third movable electrode 58 and a third stationary electrode 60. A third servomotor 62 is operatively connected to the third movable electrode 58 for clamping the workpieces 12 (not shown on FIG. 6) between the third pair of electrodes 56. The controller 48 (not shown on FIG. 6) is operatively connected to the first, second, and third servomotors 30,32, 62 to actuate the first, second, and third servomotors 30,32, 62. In one embodiment, the controller 12 selectively sequences the electric current between each of the pairs of electrodes 34,36,58, by clamping only one pair of electrodes 24 about the workpieces 12 at one time. In another embodiment, a plurality of switches is operatively connected to the controller 12 and electrically disposed between the transformer 46 and the pairs of electrodes 24 for selectively switching the electric current between each of the pairs of electrodes 24. It is preferred that the first, second, and third servomotors 30,32,62 are mounted to the weld gun 22. However, it is to be understood that in other embodiments the first, second, and third servomotors 30,32,62 could be mounted at alternative locations.

As is conventional with servo controlled spot welding guns, this system also includes sensors and software for controlling the profile of the electric current as it flows through the pairs of electrodes 24 as a function of time and/or pressure. This control assures that the welding process is optimized to produce consistent spot welds with the best quality for strength and reliability.

Obviously, many modifications and variations of the present invention are possible in light of the above teachings. The invention may be practiced otherwise than as specifically described within the scope of the appended claims.

What is claimed is:

1. A servo spot welding control system for efficiently welding a pair of workpieces together, said system comprising:
   a robot movable about the workpieces;
   a weld gun mounted to said robot, said weld gun including at least two pairs of electrodes, each pair including a stationary electrode and a movable electrode;
   a first servomotor operatively connected to one of said movable electrodes for clamping the workpieces between one of said pairs of electrodes;
   a second servomotor operatively connected to the other of said movable electrodes for clamping the workpieces between the other of said pairs of electrodes;
   a transformer for supplying electric current that flows through said pairs of electrodes for welding the workpieces together; and
   a controller to sequence the electric current between said pairs of electrodes.

2. The system as set forth in claim 1 wherein said controller is operatively connected to said first and second servomotors to actuate said first and second servomotors and to selectively switch the electric current between each of said pairs of electrodes.

3. The system as set forth in claim 1 further comprising a switch operatively connected to said controller and disposed between said transformer and said pairs of electrodes for selectively switching the electric current between each of said pairs of electrodes.

4. The system as set forth in claim 1 wherein said first servomotor and said second servomotor are mounted to said weld gun.

5. The system as set forth in claim 1 wherein said transformer is mounted to said weld gun.

6. The system as set forth in claim 1 wherein said robot has a base, a plurality of arms operatively connected to said base, and a wrist operatively connected to said arms, wherein said weld gun is mounted to said wrist.

7. The system as set forth in claim 1 wherein said controller is further defined as a robot controller and a weld controller independent from said robot controller, wherein said robot controller is operatively connected to said robot for moving said robot about the workpieces and operatively connected to said servomotors for extending and retracting said movable weld tips, and said weld controller is electrically connected to said transformer for supplying current to said transformer.

8. The system as set forth in claim 7 wherein said robot controller comprises programmable software to control the movement of said robot and said first and second servomotors.

9. The system as set forth in claim 8 wherein said software makes automatic adjustments to the movement of said robot and said first and second servomotors based on wear of said at least two pairs of electrodes.

10. The system as set forth in claim 8 further comprising at least two pressure sensors to sense a clamping pressure between each pair of electrodes.

11. The system as set forth in claim 10 wherein said robot controller is operatively connected to said at least two pressure sensors and said programmable software adjusts the clamping pressure to provide improved spot welds.

12. The system as set forth in claim 8 further comprising at least one electric current sensor to sense the electric current flowing through said pairs of electrodes.

13. The system as set forth in claim 12 wherein said robot controller is operatively connected to said at least one electric current sensor and said programmable software adjusts the amount of electric current to provide improved spot welds.

14. The system as set forth in claim 1 wherein said at least two pairs of electrodes is further defined as a first pair of electrodes and a second pair of electrodes, wherein said first pair of electrodes includes a first movable electrode and a first stationary electrode and said second pair of electrodes includes a second movable electrode and a second stationary electrode.

15. The system as set forth in claim 14 wherein said first servomotor is operatively connected to said first movable electrode for clamping the workpieces between said first pair of electrodes and said second servomotor is operatively connected to said second movable electrode for clamping the workpieces between said second pair of electrodes.

16. The system as set forth in claim 15 wherein said at least two pairs of electrodes is further defined to include a third pair of electrodes including a third movable electrode and a third stationary electrode.

17. The system as set forth in claim 16 further comprising a third servomotor operatively connected to said third movable electrode for clamping the workpieces between said third pair of electrodes.

18. The system as set forth in claim 17 wherein said controller is operatively connected to said first, second, and third servomotors to actuate said first, second, and third servomotors and to selectively switch the electric current between each of said pairs of electrodes.

19. The system as set forth in claim 17 wherein said first, second, and third servomotors are mounted to said weld gun.

20. The system as set forth in claim 16 further comprising a plurality of switches operatively connected to said controller and disposed between said transformer and said pairs of electrodes for selectively switching the electric current between each of said pairs of electrodes.

21. The system as set forth in claim 1 further comprising at least one additional transformer such that each of said at least two pairs of electrodes receives electrical current from an independent transformer.

22. A method for welding a pair of workpieces together, using a servo spot welding control system that includes a robot, a first servomotor, a second servomotor, a transformer, a controller, and a weld gun mounted to the robot, the weld gun including a first pair and a second pair of electrodes, the first pair including a first stationary electrode and a first movable electrode and the second pair including a second stationary electrode and a second movable electrode, said method comprising the steps of:

moving the robot to dispose the weld gun about the workpieces that are to be welded;

supplying electrical current to the first and second movable electrodes from the transformer;

clamping the workpieces between the first pair of electrodes on the weld gun to allow the electric current to flow through the first movable electrode, the workpiece, and the first stationary electrode to create a first spot weld;

releasing the workpieces from the clamp of the first pair of electrodes to prevent the electric current from flowing;

clamping the workpieces between the second pair of electrodes on the weld gun without additional movement of the robot wherein said clamping allows electric current to flow through the second movable electrode, the workpiece, and the second stationary electrode to create a second spot weld; and releasing the workpieces from the clamp of the second pair of electrodes to prevent the electric current from flowing.

23. A method as set forth in claim 22 wherein the step of moving the robot is further defined as automatically adjusting an orientation of the weld gun to adjust for wear of the first and second stationary electrodes.

24. A method as set forth in claim 22 wherein the step of clamping the workpieces between the first pair of electrodes is further defined as actuating the first servomotor to extend the first movable electrode and applying a pressure on the workpieces.

25. A method as set forth in claim 24 wherein the step of actuating the first servomotor is further defined as automatically adjusting the extension of the first movable electrode to adjust for wear of the first stationary electrode.

26. A method as set forth in claim 24 wherein the servo spot welding control system further includes a first pressure sensor operatively connected to the controller and the step of actuating the first servomotor is further defined as automatically adjusting the extension of the first movable electrode based on measurement of a clamping pressure from the first pressure sensor.

27. A method as set forth in claim 24 wherein the servo spot welding control system further includes a second pressure sensor operatively connected to the controller and the step of actuating the second servomotor is further defined as automatically adjusting the extension of the second movable electrode based on measurement of a clamping pressure from the second pressure sensor.

28. A method as set forth in claim 22 wherein the step of clamping the workpieces between the second pair of electrodes is further defined as actuating the second servomotor to extend the second movable electrode and applying a pressure on the workpieces.

29. A method as set forth in claim 28 wherein the step of actuating the second servomotor is further defined by the step of automatically adjusting the extending of the second movable electrode per the software to adjust for wear of the second stationary electrode.

30. A method as set forth in claim 22 wherein the step of releasing the workpieces from the clamp of the first pair of electrodes is further defined as actuating the first servomotor to retract the first movable electrode.

31. A method as set forth in claim 22 wherein the step of releasing the workpieces from the clamp of the second pair of electrodes is further defined by actuating the second servomotor to retract the second movable electrode.

32. A method as set forth in claim 22 wherein the servo spot welding control system further includes an electric current sensor and said method further comprising the step of automatically adjusting a weld time based on measurement of the electric current from the electric current sensor.

* * * * *